US008699787B2

(12) United States Patent
van den Hengel et al.

(10) Patent No.: US 8,699,787 B2
(45) Date of Patent: Apr. 15, 2014

(54) METHOD AND SYSTEM FOR GENERATING A 3D MODEL FROM IMAGES

(75) Inventors: Anton John van den Hengel, Rose Park (AU); Anthony Robert Dick, Maylands (AU); Thorsten Thormaehlen, Saaubruccken (DE); Benjamin William Stephen Ward, Adelaide (AU); Philip Hilaire Sean Torr, Rose Park (AU)

(73) Assignee: Three Pixels Wide Pty Ltd., South Australia (AU)

( * ) Notice: Subject to any disclaimer, the term of this patent is extended or adjusted under 35 U.S.C. 154(b) by 466 days.

(21) Appl. No.: 12/666,813

(22) PCT Filed: Jun. 27, 2008

(86) PCT No.: PCT/AU2008/000954
§ 371 (c)(1),
(2), (4) Date: Jul. 20, 2010

(87) PCT Pub. No.: WO2009/003225
PCT Pub. Date: Jan. 8, 2009

(65) Prior Publication Data
US 2010/0284607 A1  Nov. 11, 2010

Related U.S. Application Data

(60) Provisional application No. 60/929,501, filed on Jun. 29, 2007.

(51) Int. Cl.
*G06T 17/00* (2006.01)
(52) U.S. Cl.
USPC ............ 382/159; 382/103; 345/420; 345/419
(58) Field of Classification Search
USPC .......................... 382/154, 103; 345/420, 419
See application file for complete search history.

(56) References Cited

U.S. PATENT DOCUMENTS

| 5,633,995 A | 5/1997 | McClain |
| 5,926,575 A | 7/1999 | Ohzeki et al. |
| 6,025,847 A | 2/2000 | Marks |
| 6,434,278 B1 | 8/2002 | Hashimoto |
| 7,383,163 B2 | 6/2008 | Holberg |
| 7,567,713 B2 | 7/2009 | Ding |

(Continued)

FOREIGN PATENT DOCUMENTS

AU  2007202157 A1  11/2008

OTHER PUBLICATIONS

Podolak et al., "A Planar Reflective Symmetry Transform for 3d Shapes", ACM transaction on Graphics, Proceedings of ACM SIGGRAPH 2006, Jul. 2006, vol. 25, Issue 3.

(Continued)

*Primary Examiner* — Ruiping Li
(74) *Attorney, Agent, or Firm* — Greenblum & Bernstein, P.L.C.

(57) ABSTRACT

A method for generating a three dimensional (3D) model of an object from a series of two dimensional (2D) images is described. The series of 2D images depict varying views of the object and have associated camera parameter information. The method includes the steps of tracing the object in a first 2D image selected from the series of 2D images to provide a first set of tracing information, then tracing the object in a second 2D image selected from the series of 2D images to provide a second set of tracing information. The 3D model of the object is then generated based on the camera parameter information and the first and second sets of tracing information.

14 Claims, 16 Drawing Sheets

(56) References Cited

U.S. PATENT DOCUMENTS

| | | |
|---|---|---|
| 2002/0080139 A1 | 6/2002 | Koo et al. |
| 2004/0247174 A1 | 12/2004 | Lyons et al. |
| 2005/0140670 A1 | 6/2005 | Wu et al. |
| 2005/0143967 A1 | 6/2005 | Holberg |

OTHER PUBLICATIONS

A. van den Hengel et al., "Video Trace: Rapid Interactive Scene Modelling From Video", In Proceedings of ACM SIGGRAPH, Aug. 2007 (ACM Transactions on Graphics, vol. 26, No. 3, Article 86, Jul. 2007).

Y. Boykov et al., "An Experimental Comparison of Min-Cut/Max-Flow Algorithms for Energy Minimization in Vision", IEEE Trans. Pattern Analysis and Machine Intelligence, vol. 26, No. 9, pp. 1124-1137, Sep. 2004.

Piegle, L. et al., The NURBS book ($2^{nd}$ ed.), Springer-Verlag New York, Inc., New York, NY, USA, 1997, pp. 410-413, 472-484, and 496-507.

Shpitalni, M. et al., "Classification of Sketches Strokes and Corner Detection Using Conic Sections and Adaptive Clustering", Trans of the AMSE, Journal of Mechanical Design, vol. 119, No. 1, pp. 131-135, Mar. 1997.

Hartley, R. I. et al., Multiple View Geometry, Cambridge University Press, 2000, pp. 423-440.

Comaniciu, D. et al., "Mean Shift: A Robust Approach Toward Feature Space Analysis", IEEE Trans. Pattern Anal. Mach. Intell., Vo. 24, No. 5, pp. 603-619, May 2002.

Niem, W. et al., "Mapping Texture From Multiple Camera Views Onto 3D-Object Models for Computer Animation", In Proc. Int. Workshop on Stereoscopic and Three Dimensional Imaging, 1995, pp. 99-105.

U.S. Appl. No. 60/917,361, filed May 11, 2007.

S. Gibson et al., "Interactive reconstruction of virtual environments from video sequences", Computers and Graphics, 27, 2003, pp. 293-301.

Paul E. Debevec et al., "Modeling and Rendering Architecture from Photographs: A hybrid geometry—and image-based approach", In Proceedings of the $23^{rd}$ annual conference on Computer graphics and interactive techniques, 1996 (In Proccedings of the SIGGRAPH 96 Conference).

Paul E. Debevec et al., "Image-Based Modeling and Rendering of Architecture with Interactive Photogrammetry and View-Dependent Texture Mapping", In Proceedings of the 1998 IEEE International Symposium on Circuits and Systems, 1998.

Remo Ziegler et al., "3D Reconstruction Using Labeled Image Regions", In Proceedings of the 2003 Eurographics/ACM SIGGRAPH Symposium on Geometry Processing, 2003, pp. 1-12.

Sabry El-Hakim et al., "3D Modelling with Reusable and Integrated Building Blocks", $7^{th}$ Conference on Optical 3-D Measurement Techniques, Oct. 3-5, 2005, Vienna, Austria.

Pierre Poulin et al., "Interactively Modeling with Photogrammetry", In Eurographics Workshop on Rendering, 1998.

Kass M. et al., "Snakes: Active Contour Models", Proceedings of the International Conference on Computer Vision London, Jun. 8-11, 1987, Washington, IEEE Comp. Soc. Press, US, vol. CONF. 1, XP000971219, Jun. 8, 1987, pp. 259-268.

Search report from E.P.O., mail date is Oct. 19, 2011.

U.S. Office Action in U.S. Appl. No. 12/117,336, mail date is Dec. 29, 2011.

Australian Examination Report in Australian Patent Appl. No. 2007202157, mail date is Feb. 16, 2012.

METHOD AND SYSTEM FOR GENERATING A 3D MODEL FROM IMAGES

PRIORITY

The present application claims priority from U.S. Provisional Patent Application No. 60/929,501 entitled "Method and System for Generating a 3D Model From Images", filed on 29 Jun. 2007.

The entire content of this application is hereby incorporated by reference.

REFERENCE TO CO-PENDING APPLICATIONS FOR PATENT

The present invention is related to the following applications for patent:

Australian Patent Application No. 2007202157 entitled "METHOD AND SYSTEM FOR GENERATING A 3D MODEL" filed 11 May 2007.

U.S. Provisional Patent Application No. 60/917,361 entitled "METHOD AND SYSTEM FOR GENERATING A 3D MODEL" filed 11 May 2007.

The entire content of each of these applications is hereby incorporated by reference.

TECHNICAL FIELD

The present invention relates to image processing and analysis. In a particular form the present invention relates to the generation of a three dimensional (3D) model of an object from a series of two dimensional (2D) images.

INCORPORATION BY REFERENCE

The entire content of the following document is hereby incorporated by reference:

A. van den Hengel, A. Dick, T. Thormaehlen, B. Ward, P. H. S. Torr, "VideoTrace: Rapid Interactive Scene Modelling From Video", in Proceedings of ACM SIGGRAPH, August 2007.

The following documents are referred to in the following description:

Y. Boykov and V. Kolmogorov, "An Experimental Comparison of Min-Cut/Max-Flow Algorithms for Energy Minimization in Vision", *IEEE Trans. Pattern Analysis and Machine Intelligence,* 26(9): 1124-1137, 2004.

Piegle, L. and Tiller, W., 1997, *The NURBS book* (2nd ed.). Springer-Verlag New York, Inc., New York, N.Y., USA.

Shipitalni, M. and Lipson H, H. 1997, "Classification of Sketch Strokes and Corner Detection Using Conic Sections and Adaptive Clustering", *Trans of the AMSE, Journal of Mechanical Design,* 119, 1, 131-135.

Hartley, R. I. and Zisserman, A., 2000, *Multiple View Geometry,* Cambridge University Press.

Comanciu, D. and Meer, P., 2002, "Mean Shift: A Robust Approach Toward Feature Space Analysis" *IEEE Trans. Pattern Anal. Mach. Intell.,* 24, 5, 603-619.

Niem, W. and Broszio, H., "Mapping Texture From Multiple Camera Views Onto 3D-object Models for Computer Animation", *In Proc. Int. Workshop on Stereoscopic and Three Dimensional Imaging,* 1995, pp. 99-105

The entire content of each of these documents is hereby incorporated by reference.

BACKGROUND

The ability to generate a 3D model of an object from a 2D image of a scene containing the object has a wide variety of applications ranging from video editing to urban visualization. Typically, the generation of a 3D model of an object from a 2D image will involve an operator attempting to manually form the 3D model by recognizing the object in the image based on their own intuitive understanding of the object and then attempting to form a 3D model based on this interpretation. Clearly, this process is labor intensive and requires a high degree of skill level and in some cases artistic ability.

One significant advance in this respect is described in our earlier filed Australian Patent Application No. 2007202157, entitled "METHOD AND SYSTEM FOR GENERATING A 3D MODEL", filed 11 May 2007 and assigned to the assignee hereof, and which is expressly incorporated by reference in its entirety herein. In this application, a method for generating a 3D model of an object depicted in a 2D image revolves around an operator interactively determining a 3D geometric primitive corresponding to the shape characteristics of the object that is to be modeled. Based on this selection and 3D information associated with the 2D image, such as a reconstructed point cloud, the 3D model is then generated.

In many cases there will be a series of 2D images, often corresponding to a video stream taken whilst the camera moves with respect to the object or vice versa, thereby providing a number of different views of the object. In this case, 3D information associated with the object can be derived from structure from motion (SFM) techniques which generate a reconstructed point cloud in addition to deriving camera parameter information such as camera setting, location and orientation. However, there will be some situations where 3D information associated with the object depicted in the 2D image will not be available. This is often the case for an object having surfaces that have no fine detail or structure upon which a structure from motion (SFM) approach can generate a point cloud. In other cases, a SFM approach will yield some 3D information but this information does not correspond to locations in the series of 2D images that are useful for determining the 3D structure of the object that is being modeled.

Accordingly, there is a need for an alternative method for generating a 3D model of an object from a series of 2D images corresponding to different views of the object that is being modeled.

SUMMARY

In a first aspect the present invention accordingly provides a method for generating a three dimensional (3D) model of an object from a series of two dimensional (2D) images, wherein the series of 2D images depict varying views of the object and have associated camera parameter information, the method including the steps of:

tracing the object in a first 2D image selected from the series of 2D images to provide a first set of tracing information;

tracing the object in a second 2D image selected from the series of 2D images to provide a second set of tracing information; and generating the 3D model of the object based on the camera parameter information and the first and second sets of tracing information.

In a second aspect the present invention accordingly provides a method for generating a 3D model of an object from a plurality of two dimensional (2D) images, wherein the plurality of 2D images depict varying views of the object, the method including the steps of:

deriving a first set of 3D information related to the object from a first 2D image and associated camera parameter information, the first 2D image selected from the plurality of 2D images;

deriving a second set of 3D information related to the object from a second 2D image and associated camera parameter information, the second 2D image selected from the plurality of 2D images; and generating the 3D model based on the first and second sets of 3D information.

In a third aspect the present invention accordingly provides a method for generating a 3D model of an object from a series of two dimensional (2D) images, wherein the plurality of 2D images depict varying views of the object and have associated camera parameter information, the method including the steps of:

selecting a geometric primitive and lining up the geometric primitive with the shape characteristics of the object to trace the object in a first 2D image;

modifying the geometric primitive after being projected onto a second 2D image to trace the object in the second 2D image; and generating the 3D model based on the geometric primitive and the camera parameter information associated with the first and second 2D images.

In a fourth aspect the present invention accordingly provides a method for generating a 3D model of an object from a series of 2D images, wherein the series of 2D images depict varying views of the object and have associated camera parameter information, the method including the steps of:

tracing the object in a first 2D image selected from the series of 2D images to provide a first set of tracing information;

processing a second 2D image selected from the series of 2D images to determine feature information of the object; and generating the 3D model of the object based on the camera parameter information, the first set of tracing information and the feature information.

In a fifth aspect the present invention accordingly provides a method for inserting a 3D model of an object derived from a first series of 2D images ("cutting/copying") into a second series of 2D images ("pasting"), the method including the steps of:

generating a 3D model of the object based on camera parameter information associated with the first series of 2D images and by tracing the object in at least two images from the first series of images; and inserting the 3D model into the second series of 2D images.

In a sixth aspect the present invention accordingly provides a method for generating a 3D model of a complex object, the method including the steps of:

generating a component 3D model of a component part of the complex object; and exploiting the shape of the component 3D model to develop a 3D model of the entire complex object.

BRIEF DESCRIPTION OF THE DRAWINGS

Exemplary embodiments of the present invention will be discussed with reference to the accompanying drawings wherein.

In the following description, like reference characters designate like or corresponding parts throughout the several views of the drawings.

DETAILED DESCRIPTION

Figure 1:
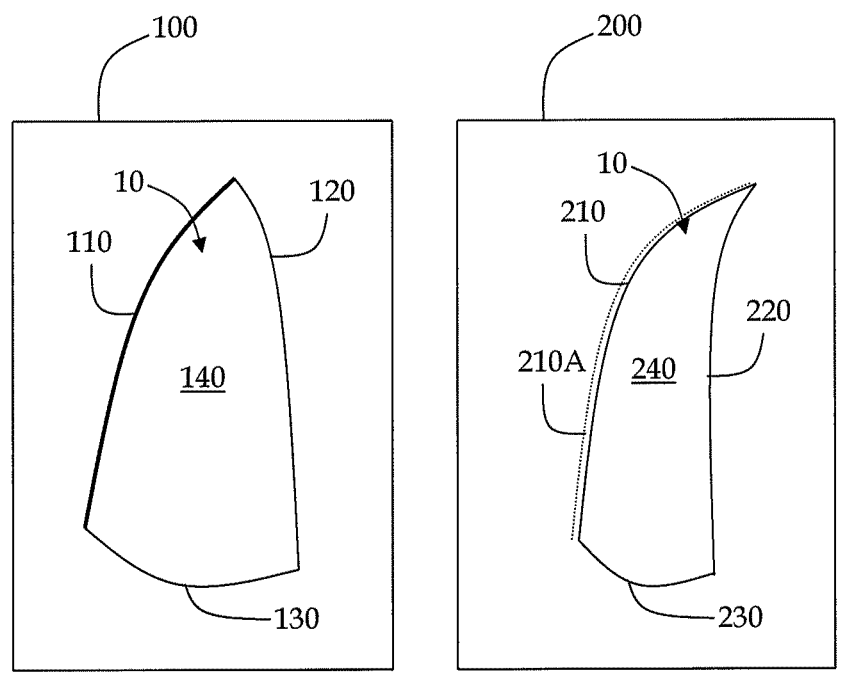
FIG. 1 depicts figuratively a series (two) of 2D images of an object.

Referring now to FIG. 1, there is depicted a series (two) of 2D images 100, 200 of an object 10. In this example, object 10 can be envisaged as a sail shaped object having a non-regular but smooth structure. First image 100 depicts an approximate front-on view of object 10 whilst second image 200 depicts a side-on view of object 10. First and second images 100, 200 are taken to be from a sequence of images from a video camera that is moving from the front of object 10 to the right hand side (as viewed front-on) of object 10.

As would be appreciated by those skilled in the art, it is not necessary that the series of 2D images be taken from a video stream such as would be generated by a video camera but equally the series of 2D images may comprise a number of "still" images that are not necessarily taken in any time sequence but only relate to a number of images that correspond to different views of the relevant object of interest.

In 2D, object 10 can be represented as being bounded by three 2D boundary lines 110, 120 and 130 that bound a 2D surface 140 in first image 100 and in second image the same 2D surface 240 is bounded by three corresponding 2D lines 210, 220 and 230. As would be apparent to those skilled in the art, each 2D line in itself corresponds to a 3D object i.e. a 3D line in space which will form a boundary to a 3D surface in space corresponding to 2D surface 140, 240. The form of this boundary will vary depending on the view or camera orientation and the shape of object 10 itself.

As any 3D object may be generalized as a combination of 3D surfaces which themselves are defined by a combination of 3D lines the task of generating a 3D model of an object may be viewed in one exemplary embodiment as involving first determining 3D lines corresponding to 2D lines within a series of images and from these 3D lines then determining the combination of surfaces which form an object.

Throughout this specification, the term 2D line is taken to mean a line segment, whether curved or rectilinear or a combination of both, that may be represented by a two dimensional coordinate system. A line is defined to have a start point and an end point, which are referred to as "endpoints". Non limiting examples of such coordinate systems include Cartesian coordinates (x, y), or in another example, polar coordinates (r, θ). In the case where the 2D line is taken from a 2D image, the two dimensional coordinate system may correspond to horizontal and vertical pixel count.

Furthermore, throughout this specification, the term 3D line is taken to mean a line segment that exists in space, whether the line segment is curved or rectilinear or a combination of both, that may be represented by a three dimensional coordinate system. Non limiting examples of such coordinate systems include Cartesian coordinates (x, y, z), or in another example, spherical coordinates (r, θ, φ). In addition a 3D surface is a generalized surface that exists in three dimensions.

To provide a general formalism or framework to the process of generating 3D models from 2D characteristics of an image in accordance with the exemplary embodiments described herein, the following formalism is adopted as an aid to explanation and implementation. As would be apparent to those skilled in the art, the adoption of this formalism is merely by way of convenience and other ways of implementing the present invention are contemplated to be within the scope of the invention.

In this formalism a series of "production rules" are defined which function to operate on two lists. The first is a list of interactions defined as the Mist and the second is a list of modeled 3D entities (e.g. 3D lines, 3D surfaces, combinations of 3D surfaces, etc) defined as the M-list. Since interactions are all in 2D, the Mist contains 2D entities (i.e. 2D lines). These are grouped according to whether they are connected in the 2D image and as such each 2D image in a series of images has its own I-list.

One important implementation benefit of the production rule formalism adopted herein is that the same input and output formats are used for each modeling task, thereby allowing the output of one step to form the input of another. This facility is useful for the modeling of non-visible aspects of an object as it allows a 3D line modeled on one of the series of images to be extruded past the image boundaries and then replicated as will be described below.

Following is an example subset of the implemented rule set directed to the drawing or tracing of 2D lines on a 2D image by an operator. These production rules are defined in the following format Name {Input} [Precondition] ⇒ Effect. and consist of:

Add line {Single drawn line} [Drawing mode] ⇒ Add 2D line to a new group in the I-list.

Group lines {Single drawn line} [Drawing mode, Drawn line endpoint equals an existing endpoint] ⇒ Add new 2D line to existing 2D line's group in the I-list.

Close curve {Single drawn line} [Drawing mode, Both line endpoints equal endpoints within existing group] ⇒ Add closed 2D line group to I-list.

Combine groups {Single drawn line} [Drawing mode, Both line endpoints equal endpoints within different groups] ⇒ Merge groups and add new 2D line to merged group.

Edit line {Click and drag on line} [Line edit mode] ⇒ Update selected 2D line and any 3D entity that depends on that 2D line.

Figure 16:
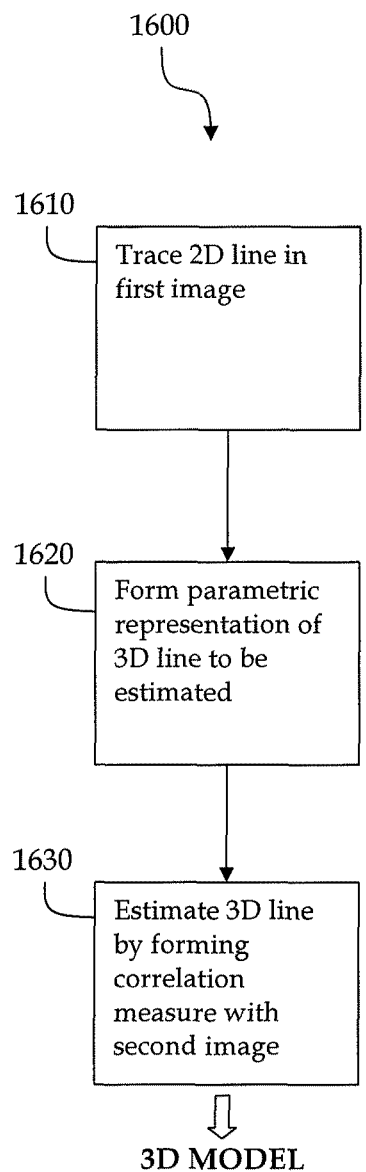
FIG. 16 is a flowchart of the steps for generating a 3D model from a series of images in accordance with an exemplary embodiment of the present invention.

Referring once again to FIG. 1 and also to FIG. 16, in accordance with an exemplary embodiment of the present invention a 3D line is generated from a chosen line such as boundary 2D line 110. Adopting the formalism described above, the production rule for this process is 3D curve from line Single drawn line [Drawing mode] ⇒ 3D line added to M-list At step 1610, the operator will trace over boundary 2D line 110 in first image 110 (shown in bold). As discussed previously, boundary line 110 forms part of the boundary of object 10. This tracing operation may be aided by an automatic snap fitting process to strong pixel boundaries where the relevant 2D line being traced corresponds to an edge or vertice of an object such as in this case. This ensures that an operator requires little or no artistic ability, nor is "pixel perfect" tracing required.

As would be apparent to those skilled in the art, a curved 2D line traced by an operator on a 2D image does not, of itself, contain sufficient information to recover the required 3D line.

In accordance with this exemplary embodiment, camera parameter information is employed to generate the 3D line. This camera parameter information may come from directly measured parameters of the camera such as camera settings, orientation and location or in another alternative this camera information may be recovered indirectly through SFM techniques.

The 2D traced line 110 has fixed (known) length and thus can be modeled in parametric form as $$l(u)=(x(u),y(u))^T \text{ with } 0.0 \le u \le 1.0 \quad (1)$$

In this parametric form each allowable value of it specifies a location along the line. Every point I(u) represents the projection of a point (or a set of points) on the 3D line into the drawing image 100. The point I(u) thus specifies a ray projected from the camera's location as defined by the camera parameter information into scene space which intersects the 3D line at least once. The points in scene space at which this intersection occurs may be identified by the distance along the projected ray at which they occur. This distance is labeled d.

Many points on the traced or drawn curve (specified by different u values) may have the same depth in the scene, implying that multiple u may correspond to the same d. The viewing orientation of the camera may be tangential to the 3D line, or intersect the 3D line multiple times, meaning that many points on the 3D line project to the same image point.

This implies that there may be multiple distances d for a single u. The mapping from u to d is thus many-to-many.

At step 1620, a representation of a possible 3D line L is formed by sampling a set U of 100 equally spaced points u that are distributed along the length of the traced 2D line 110. Similarly, a set D of 100 potential values for d is selected on the basis of the range of distances from the camera centre at which reconstructed points occur. In the case where there are no reconstructed points, the values D are chosen to span the intersection of the cameras' viewing volumes which is derivable from the camera parameter information.

A line I and a {u, d} pair specifies the location of a point in scene space which is labeled L(u, d). A 3D line L is therefore fully specified by identifying the set $D_u = \{d_1, \ldots, d_N\}$ of intersection distances for every allowable u along a drawn curve I. There are thus a set of possible 3D lines $L = \{L_1, \ldots, L_M\}$ all of which project into the drawing image to give the drawn lines I.

At step 1630, the desired 3D line $\hat{L}$ from this set is identified by selecting L∈L which is best supported by the images 100, 200. Neigbouring points on I are required to correspond to neighbouring points on L, thereby effectively constraining the 3D line L to be continuous.

In this exemplary embodiment, a hypothesis is formed that if 3D point L(u, d) is part of $\hat{L}$, then it must lie on the surface of an object in the scene. This use of feature information of the object is based on the reasoning that a point on the surface of an object can be expected to have a similar appearance in each image in which it is visible. In order to test whether a hypothesised L(u, d) lies on the surface of an object its location is reprojected back into the set of images or in this case images 100, 200 that neighbour the traced image 100.

The normalised cross-correlation between the surrounding image patches is then measured. A strong correlation between all projections of a point L(u, d) supports the hypothesis that it lies on the surface of an object and thus is part of the intended 3D line. Cross correlation is one of several image based similarity measures that could be used for this task. For example, colour histograms describing the image patch surrounding each projection of L(u, d) could be compared. Similarly histogram of image gradients in the surrounding image patches could also be compared.

If the image patch surrounding the projection of the 3D point P into image I is labeled as I(P), then the normalised cross correlation between the drawing image patch $I_d(P)$ and the corresponding target image patch $I_t(P)$ is $C(I_d(P), I_t(P))$. If the image set over which this correlation measure is performed is labelled $I = \{I_k\}, k=1 \ldots K$ (in this case images 100, 200) then the total correlation measure for P in I is $$J_c(I, P) = \frac{1}{K} \sum_{k=1}^{K} C(I_d(P), I_k(P)). \tag{2}$$

Let $\Delta P$ represent the image intensity gradient of an image patch P. The image gradient corresponding to the point P is measured by $$J_\Delta(I, P) = \frac{1}{K} \sum_{k=1}^{K} \Delta I_k(P)^{-1}. \tag{3}$$

The total cost for a hypothetical point P on a line is a weighted sum of these two measures (2) and (3):

$$J(I,P) = \alpha J_c(I,P) + \beta J_\Delta(I,P). \tag{4}$$

The scalars α and β reflect the relative scales of $J_c$ and $J_\Delta$, and have been set at 0.7 and 0.3 respectively on the basis of testing with real image series.

The total cost associated with each 3D line is constructed from the sum of these measures calculated for each point along the length of the 3D line:

$$J(I, L) = \sum_{u \in U} \sum_{d \in D_u} J(I, L(u, d)) \tag{5}$$

where $D_u$ is the set of d∈D such that L(u,d) is an element of the 3D line L.

The continuous 3D line from L for which J (I,L) is minimal is then determined. In order to identify the continuous curve with the minimal total cost efficiently, the max-flow algorithm is used to find the lowest cost path through a graph (see Y. Boykov and V. Kolmogorov, "An Experimental Comparison of Min-Cut/Max-Flow Algorithms for Energy Minimization in Vision", *IEEE Trans. Pattern Analysis and Machine Intelligence*, 26(9): 1124-1137, 2004, hereby expressly incorporated by reference in its entirety). Other optimisation methods such as dynamic programming or gradient based methods could also be used for this task, although they lack the efficiency and convergence properties of the max-flow algorithm.

The graph is effectively a Markov Random Field (MRF) with pairwise costs determined by equation (4). An advantage of graph-based max-flow approach is that it allows "S"-shaped cuts, which provides the flexibility required to represent the many-to-many mapping between u and d. The max-flow process typically requires approximately one second to reach a solution for a single 3D line on standard PC based system.

Figure 2:
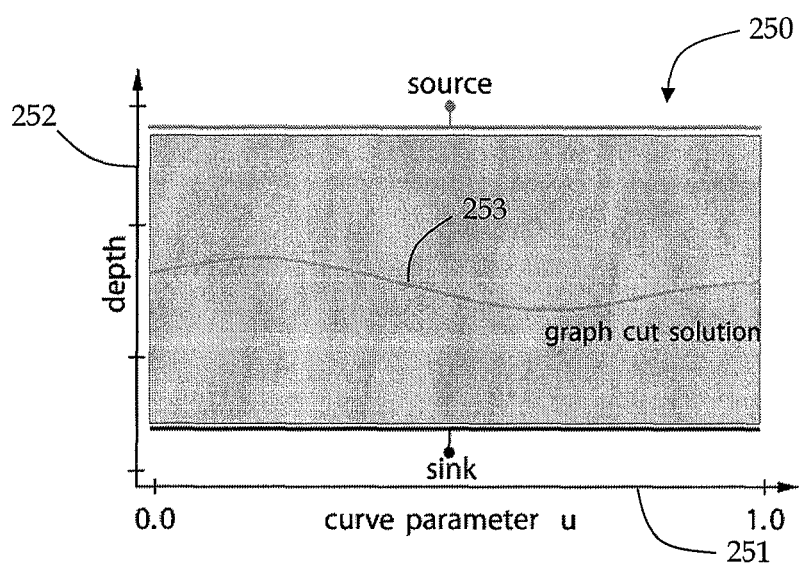
FIG. 2 is a graph of a single Markov Random Field (MRF) that corresponds to line 110 illustrated in FIG. 1.

Referring now to FIG. 2, each node in graph 250 represents a {u,d} pair selected from U and D respectively. The nodes are arranged in a lattice structure with increasing values of u along the positive x-axis 251 and increasing values of d along the positive y-axis 252. Each node is connected to four neighbouring nodes, with the weights on the links in the positive x and y directions set to J (I, L(u,d)). Source and sink nodes are connected by zero-weight links to the top and bottom rows of nodes respectively.

The max-flow algorithm finds the continuous cut 253 through the graph which minimises the sum of the weights of the severed links. This sum is approximately equivalent to the value of J (I,L). In fact, the sum of weights of cut links equals J (I,L) if the cut is parallel to the x-axis. The solution is biased against cuts parallel to the y-axis, which means that it is biased against solutions which ascribe multiple d values to the same u. This helps to prevent zig-zag solutions. In this exemplary embodiment, the generated 3D line is paramaterized as a 3D Non-uniform Rational B-Spline (NURBS) line based on the graph cut solution. The recovered 3D points L(u,d) are then used as control points in order to generate the NURBS line.

In this manner, a 3D line (or equivalently a 3D model) has been generated from a series of 2D images that include the equivalent 2D lines. This line is projected into the second image 200 as 2D line 210A. If the estimate of the 3D line L(u,d) is accurate, this projection will be satisfactory, but for the purposes of illustration here, 2D line 210A is shown to be offset slightly.

Figure 17:
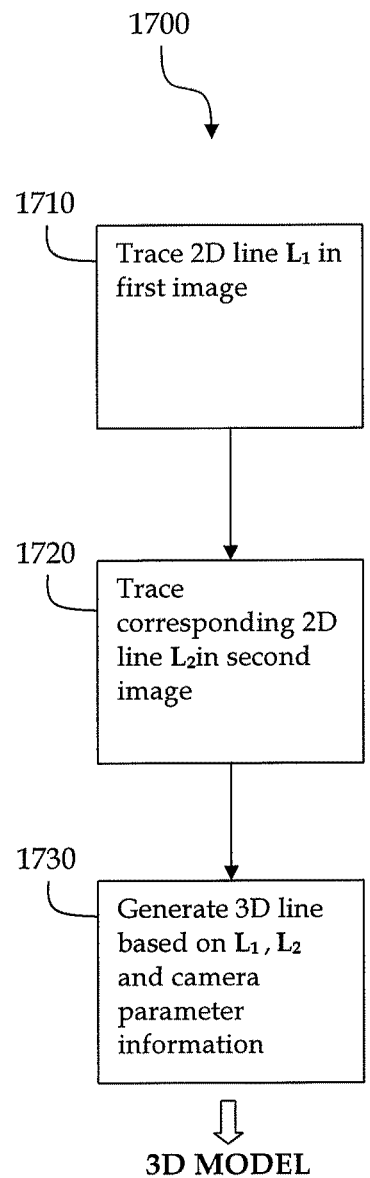
FIG. 17 is a flowchart of the steps for generating a 3D model from a series of images in accordance with a further exemplary embodiment of the present invention.

Referring now to FIG. 17, there is shown a flowchart 1700 of a method for generating a 3D model of an object in accordance with a further exemplary embodiment of the present invention. Now that a 3D line (corresponding to 2D line 210A) has been estimated on the basis of first image 100, this estimate can be further refined in accordance with this exemplary embodiment by incorporating information from the second image 200 as defined by an operator.

At step 1710, as described previously a first 2D line 110 has been traced in first image 100. While in this case a first estimate of the 3D line has been generated in accordance with the previously described exemplary embodiment, this is not an essential step in this further exemplary embodiment as it does not necessarily rely on any initial calculation or generation of a 3D line.

At step 1720, the operator traces the corresponding 2D line 210 in the second image. The production rule for this process is:

3D curve from 2 lines Pair of traced 2D lines in different images [Drawing mode] ⇒ 3D line added to M-list At step 1730 the 3D line corresponding to 2D lines 110, 210 is generated. In order to determine this 3D line, the problem is posed as a graph-based optimisation process, and the max-flow algorithm as described above is used to find the best solution. Let the lines drawn in the first image 100 be $L_1$ (i.e. line 110) and the corresponding line in the second image be $L_2$ (i.e. line 120), and as previously described, define line each in parametric form such that $$L_1(u_1) = (x_1(u_1), y_1(u_1))^T \text{ with } 0.0 \le u_1 \le 1.0 \text{ and}$$

$$L_2(u_2) = (x_2(u_2), y_2(u_2))^T \text{ with } 0.0 \le u_2 \le 1.0. \quad (6)$$

Each line-of-sight through a point $(x_1(u_1), y_1(u_1))^T$ on $L_1(u_1)$ in the first image, defines a ray when projected into the second image. By calculating the intersection of this projected ray with $L_2(u_2)$ the correspondence between $u_1$ and $u_2$ can be identified. The set of correspondences defines the reconstructed 3D line. The projected ray may, however, intersect $L_2(u_2)$ multiple times, and may also be tangential to $L_2(u_2)$ in places. The correspondences between $u_1$ and $u_2$ may thus be many-to-many.

Figure 3:
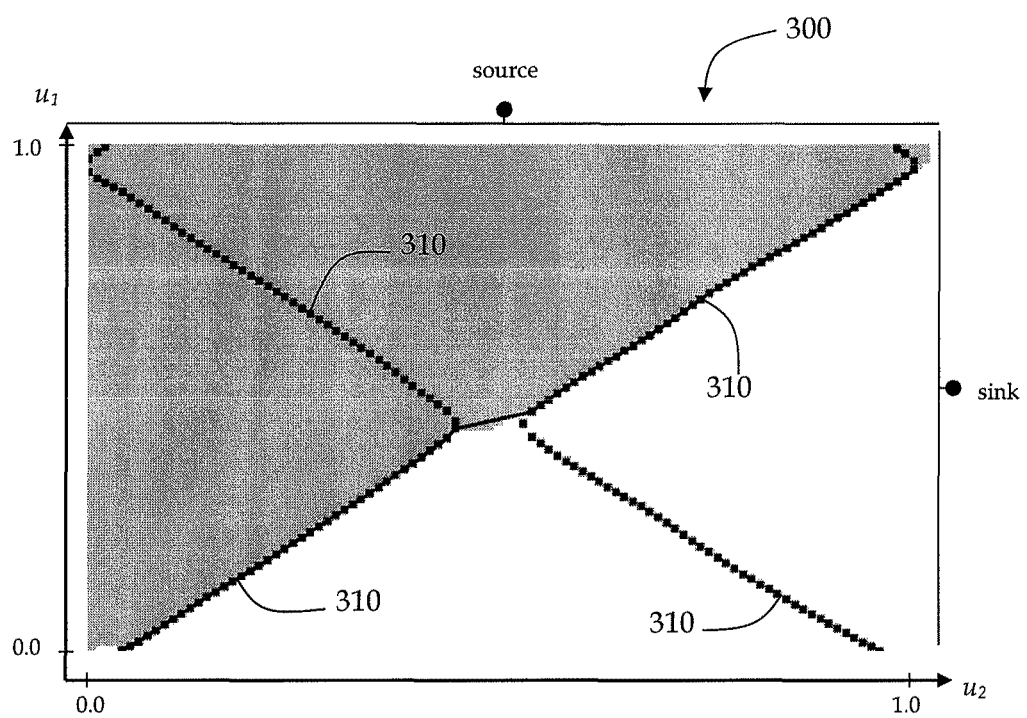
FIG. 3 is a graph of a MRF corresponding to the tracing over of corresponding lines (e.g. lines 110 and 210) of the first and second images illustrated in FIG. 1.

Referring now to FIG. 3, there is shown an image pair with traced 2D lines, and the corresponding graph 300. Once again, in order to represent the problem as a graph, both $L_1$ and $L_2$ are sampled regularly along their lengths. Each $(u_1, u_2)$ pair is allocated to a row and column of the graph respectively. Each node in the graph thus represents a correspondence between a particular value of $u_1$ and $u_2$, and thus identifies a potential point on the reconstructed intersection 3D line.

Each node in the graph is connected to its four closest neighbours, and all edge weights set to 1 initially. Each node which represents the intersection of a ray and a line has all of its edge weights set to 0 (see nodes 310 in the graph in FIG. 4.) The left and upper boundary nodes of the graph are connected to the source by an edge with weight 0, and the right and bottom boundaries to the sink similarly.

The optimal cut through the graph partitions the nodes along the minimal cost path, which corresponds to the minimal cost intersection curve. This method is fast enough to be used interactively, and flexible enough to deal with missing data and matching ambiguities. The missing data problem arises particularly when the start and endpoints of the curve are not the same in the two images, and when the 3D line is partially occluded in one image.

In this manner, by using the two images 100, 200 the 3D lines corresponding to lines 110 and 210 as shown in the first and second image can be generated by sketching on one or both of the images. In this case, this represents the generation of a 3D model of one boundary of an object 10. As would be apparent to those skilled in the art, the object may in fact only include a 3D line and in these circumstances, the relevant 3D model may be said to have been generated. As also would be apparent to those skilled in the art, the 3D model can be further refined based on multiple images having multiple views of the object of interest. Similarly, 3D curves can be generated from corresponding lines 120, 220 and 130, 230 with the set of three 3D curves thus generated forming a constraint on the 3D representation of object 10.

Figure 4A:
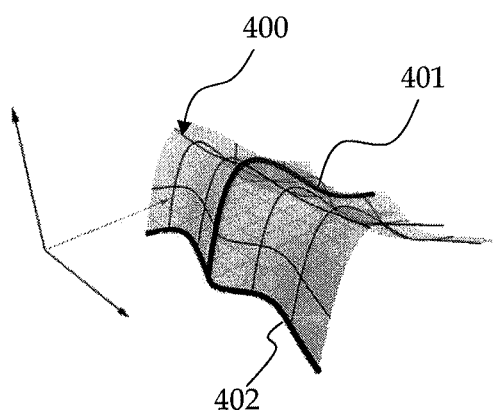
FIGS. 4a to 4c depict representations of 3D NURB surfaces formed under varying boundary line scenarios.
Figure 4B:
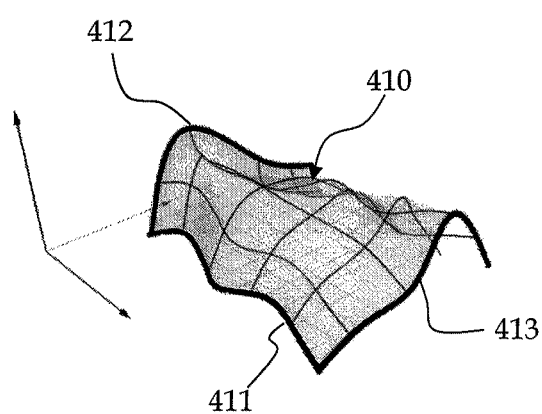
Figure 4C:
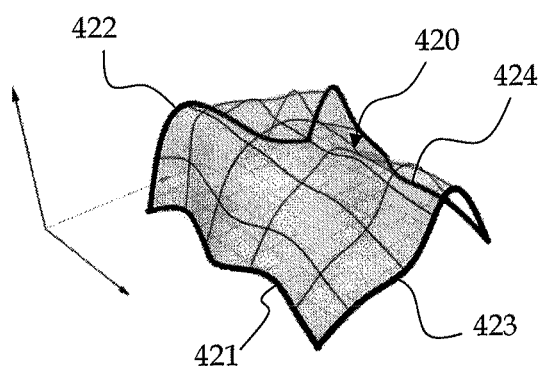

In accordance with a further exemplary embodiment, a 3D model corresponding to the 3D surface that corresponds to object 10 is generated from the 3D lines that have been calculated corresponding to 2D lines 110, 210, 120, 220 and 130, 230. The production rule defining this process is:

3D surface from line group Closed line group [Surface mode] ⇒ 3D surface added to added to M-list Referring now to FIGS. 4a to 4c, there is shown figuratively a number of approaches to generating a NURBS 3D surface from generated 3D lines. Once multiple NURBS 3D lines are reconstructed they can be used to generate NURBS 3D surfaces (see for example Piegle, L. and Tiller, W., 1997, *The NURBS book* (2nd ed.). Springer-Verlag New York, Inc., New York, N.Y., USA, hereby expressly incorporated by reference in its entirety).

Referring to FIG. 4a, a 1-rail sweep surface 400 can be constructed from two curves by sweeping a section curve 401 along a rail curve 402. Referring to FIG. 4b, a 2-rail sweep surface 410 provides even more freedom over the shape of the surface and can be generated from three 3D lines 411, 412, 413 by sweeping a section curve 411 along two rail curves 412, 413. Referring to FIG. 4c, there is shown a Coon surface 420 which is interpolated from four compatible boundary 3D lines 421, 422, 423, 424. As would be apparent to those skilled in the art, the applicable approach to generating the NURBS surface will depend on the configuration of the boundary 3D lines.

In another exemplary embodiment, where reconstructed object points are available, the generated NURBS 3D surface is further refined by fitting the surface to the object points. In this process a Levenberg-Marquardt optimizer employs the existing 3D surface as a starting point and minimizes the distance between the object points and the surface by altering the control points of the NURBS 3D surfaces. In this embodiment, the number of control points in the NURBS 3D surface must be selected so as to reflect the number of data points available.

If the number of control points is too high, the optimizer can generate unpredictable results. Accordingly, the number of knots and control points of the NURBS 3D surface may be calculated using the method described in Chapter 9.4.1 of the Piegl and Tiller 1997 reference referred to above. This method guarantees that every knot span contains at least one data point. In this method, the control points on the boundary curves remain unchanged during the optimization process.

Figure 18:
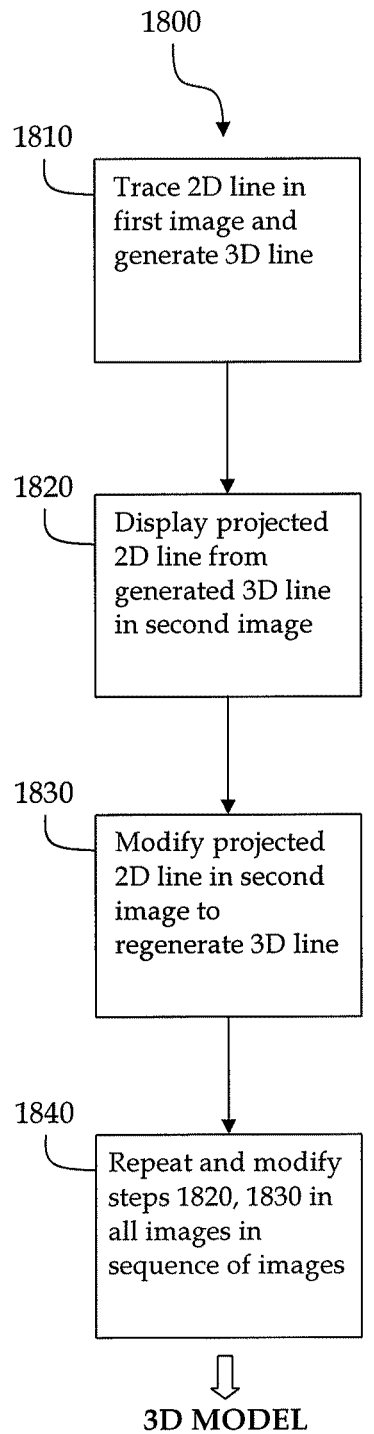
FIG. 18 is a flowchart of the steps for generating a 3D model from a series of images in accordance with yet another exemplary embodiment of the present invention.

Referring now to FIG. 18, there is shown a method 1800 of generating a 3D model according to yet another exemplary embodiment. At step 1810 an operator traces a first 2D line and an initial estimated 3D line is generated and the equivalent projected 2D line is displayed at step 1820 on one or more images in the series of images. In another embodiment, a candidate 2D line is simply displayed on the one or more other images in the series of images. At step 1830 the operator then modifies the projected or candidate 2D line to line it up with the object that has been traced on the first image. This modification then causes regeneration and update of the equivalent 3D line and this regenerated 3D line is then projected onto each of the one or more other images in the series of images. At step 1830, this process is repeated by the operator on each of the images in the series until the operator is satisfied that each of the projected 2D lines for each image line up with or trace the relevant feature that is being modeled.

Figure 5:
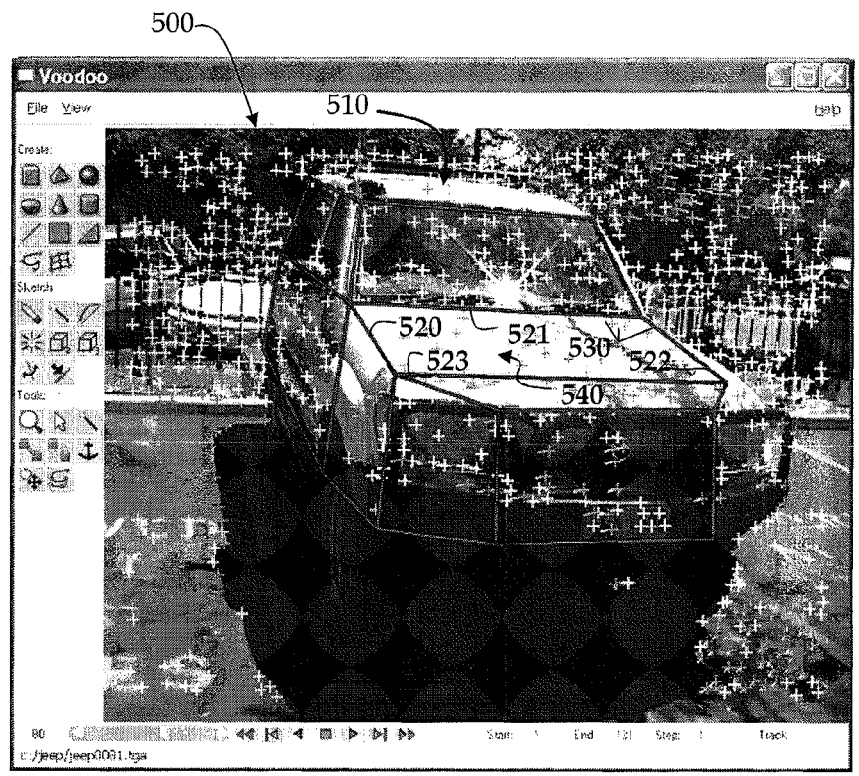
FIG. 5 is a 2D image of a four wheel drive vehicle showing a reconstructed point cloud and traced polygons.

Referring now to FIG. 5, there is shown a 2D image 500 from a software program embodying the method of generating a 3D model as described herein. 2D image forms one of a series of images from a video image sequence (not shown) corresponding to different views of four wheel drive vehicle 510 which in this example is the object to be modeled. As has been described previously the modeling of a complex 3D object such as vehicle 510 will require the generation and linking of multiple individual models for 3D lines and 3D surfaces.

In this exemplary embodiment the video image sequence has been captured using a hand-held consumer-grade video camera and does not require any specialized equipment. Before any interactive modeling takes place a SFM analysis is carried out on the video sequence to provide camera parameter information and where applicable reconstructed 3D point information (see for example Hartley, R. I. and Zisserman, A., 2000, *Multiple View Geometry*, Cambridge University Press, hereby expressly incorporated by reference in its entirety).

Additionally, in this exemplary embodiment each 2D image from the video images sequence is segmented using a deliberately low threshold, so that the output is a large number of small clusters of adjoining pixels, where all pixels belonging to each cluster have a similar colour (see for example Comanciu, D. and Meer, P., 2002, "Mean Shift: A Robust Approach Toward Feature Space Analysis", *IEEE Trans. Pattern Anal. Mach. Intell.*, 24, 5, 603-619, hereby expressly incorporated by reference in its entirety). All 2D image operations are then based on these "superpixels" rather than the raw image pixel grid.

This process of forming superpixels accelerates region clustering and edge finding operations, since only superpixels as a whole and superpixel boundaries need be considered (see for example Ren, X. and Malik, J., 2003, Learning a Classification Model for Segmentation", In *Proc. 9th Int'l. Conf. Computer Vision*, Vol. 1, 10-17, hereby expressly incorporated by reference in its entirety).

As an example, to model a polygonal face such as the front bonnet 540 of vehicle 510, an operator traces out its boundary in a first image or video frame as a set of 2D line segments 520, 521, 522, 523. As an aid to the tracing operation, nearby lines are automatically joined using the endpoint clustering method. (see for example Shipitalni, M. and Lipson H, H. 1997, "Classification of Sketch Strokes and Corner Detection Using Conic Sections and Adaptive Clustering", *Trans of the AMSE, Journal of Mechanical Design*, 119, 1, 131-135, hereby expressly incorporated by reference in its entirety).

Each closed set of line segments that does not contain any internal lines is then used to generate a 3D surface by the process of first generating 3D lines which bound the 3D surface. This fit can be overridden if necessary by manually moving line endpoints, re-drawing lines, and drawing new lines on existing faces. In this exemplary embodiment, if an operator traces the boundary of a surface using only straight lines, it is assumed that the bounded face is planar such as the case of bonnet 540 here.

Estimation of a polygonal face can be considered as a special case of curved surface estimation, but for the sake of efficiency it is carried out using a simpler method. In this case the operator sketches a set of straight line segments, rather than curved lines. The polygon is estimated by fitting a 3D plane to the set of reconstructed 3D points whose projections lie within the projected outline of the polygon. To ensure robustness to reconstructed points that do not belong to the polygon, the fitting process is carried out multiple times using different subsets of the points. The estimate that fits the greatest number of points is retained. Following this, a group of estimated polygons is refined by forming a colour histogram based on the image pixels within its boundary. This histogram is compared to histograms based on the pixels covered by the projection of the polygons into other images. The orientation and boundary of the polygons is modified to maximise the similarity of these colour histograms. This fitting and projection process is effectively instant, which allows the user to select another image in the series of images in which to edit the shape at will and thereby further improve the generated 3D model of the 3D surface.

Editing in another image allows manipulation of the 3D placement of the planar surface, but also modification of its boundary. In another image it may become apparent that what appeared to be a straight boundary in a first image is in fact curved. In this case, it is possible to turn a straight boundary into a curve by selecting the 2D line on the 2D image and tracing it onto the curve boundary as required. The drawn curved 2D line then replaces the boundary of the planar surface which was previously specified by the rectilinear 2D line.

If the line to be replaced forms part of the boundary of more than one plane, then the plane with the normal closest to the viewing direction has its boundary replaced by the planar curve. The adjacent planar surfaces have their boundaries adjusted to join the modified boundary of this plane. This adjustment is typically out of the plane of the adjacent surfaces, which are therefore tesselated to form a set of independent triangles. The triangle vertices are chosen from the endpoints of the straight line segment boundaries and the control points of the curved boundary.

As has been described previously, an operator can then navigate to another frame from the video image sequence or series of images to refine the 3D model. The 2D projected outline of the current 3D shape of the model is projected into this new frame to assist the user in making adjustments. In order to perform this projection a 3D model is calculated on the basis of all interactions thus far, as described below. The operator is then able to drag line endpoints or lines in this new view so that they trace out the boundaries of the same polygons as in the initial view with these interactions being used to refine the 3D model so that it fits the projections in both 2D images.

Accordingly, in line with this exemplary embodiment the 3D shape and position of the model is repeatedely regenerated in order to support these interactions. In a further embodiment, where reconstructed 3D point information (see for example points 530 in FIG. 5) is available, such as would result from a SFM analysis, an initial estimate of the 3D position and orientation of each face is obtained by fitting planes to the set of these reconstructed 3D points whose images lie within the area bounded by the operator traced 2D line segments.

This fitting process occurs in real time. This allows the user to switch between images from the original series of images naturally, selecting the most appropriate view of the scene at each stage. Through this process the user rapidly develops an accurate 3D model of the object through a set of intuitive 2D interactions. The model can be rendered using texture maps obtained from frames of the video.

Figure 6:
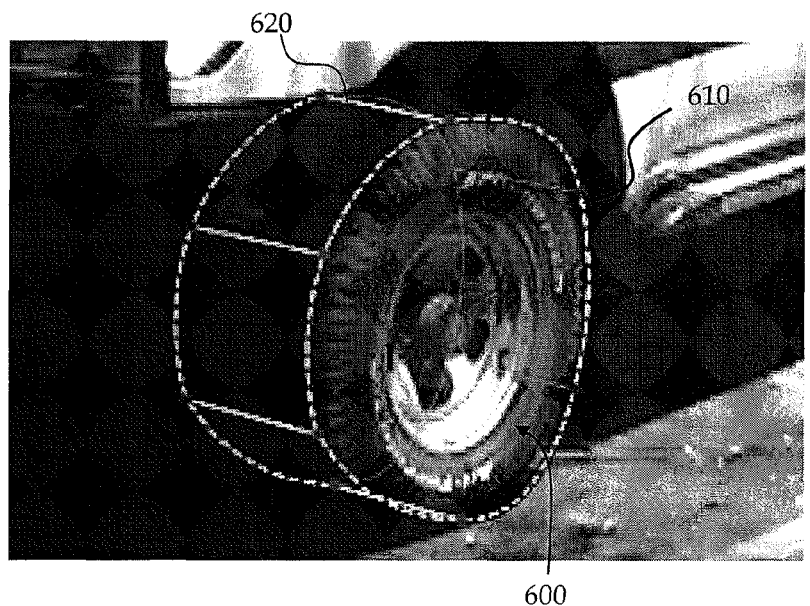
FIG. 6 is a 2D image of a tire of the four wheel drive vehicle illustrated in FIG. 5 illustrating the extrusion of a planar shape in order to generate a 3D model of the tire in accordance with an exemplary embodiment of the present invention.

In another exemplary embodiment, an operator is able to create a 3D model of an object by extruding an already defined planar shape. The production rule defining this process is:

Extrude Drawn extrusion line [Extrude mode] ⇒ Faces added to M-list to extrude selected surfaces Referring now to FIG. 6, a 3D model of a tyre 600 belonging to the vehicle 510 depicted in FIG. 5 is generated based on the edge planar profile 610. In this process an operator selects a location on edge planar profile 610 to be extruded and draws a stroke 620 in the direction of extrusion. The end point of the stroke determines where the new face will be positioned by the following method.

A ray in 3D space that extends from the camera centre c through the stroke endpoint in the image, $r_e = c + t_1 e$ is first defined. Define another ray $r_n = v + t_2 n$ from the selected vertex v in the direction of the face normal n. The intersection of these rays defines the location of the extruded version of the selected vertex. If the rays do not intersect, the point on $r_e$ that is closest to $r_n$ is used. This point can be calculated in closed form as $v_{ext} = c + t_{ext} e$ where $$t_{ext} = (v-c) \cdot (n \times (e \times n)) \qquad (7)$$

The location of the rest of the extruded geometry is then determined by translating the existing geometry by $v_{ext} - v$. Once this extra structure has been added to the model, it is projected to the other images in the image series as if it had been manually specified. Thus the extruded model may not be exactly symmetrical, if the image data suggests otherwise.

As would be apparent to those skilled in the art, this extrusion process is particularly useful for modeling solid objects like cars that are essentially a planar profile having depth. In this example, the process of extrusion can take a planar set of faces and creates a duplicate of those faces, separated from the original faces by a distance specified by the user. If image information is available, the new faces may be fitted to the images by an automatic fitting process such as described earlier. The extrusion operation can also be used to complete an extruded model even if the other side of it is not visible in any of the images in the image series.

Figure 7A:
FIGS. 7a and 7b depict the extrusion of a bumper bar of a truck in order to generate a 3D model of the bumper bar in accordance with an exemplary embodiment of the present invention.
Figure 7B:
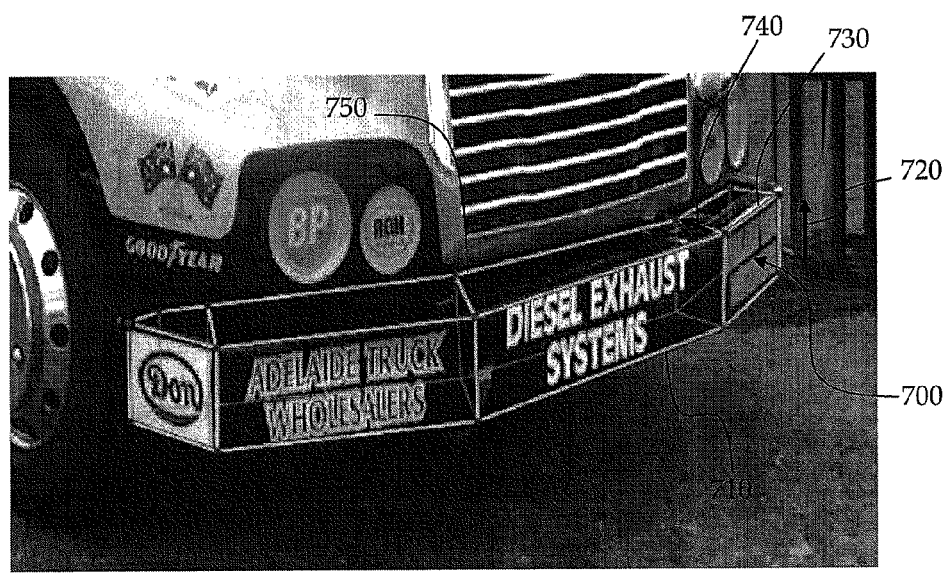

Referring now to FIGS. 7a and 7c, there is shown the use of extrusion to model the bumper 700 on the front of a truck. Initially, the lower edge 710 of the bumper 700 is traced out and snapped to image edges. The front face of the bumper 700 is then modeled by extruding this lower edge upwards 720 with a single mouse stroke to the location of the bumper upper edge 730. Finally, the top of the bumper 700 is modeled by extruding the bumper upper edge 730 inwards 740 again with another mouse stroke to the location of the bumper top inner edge 750. As would be apparent to those skilled in the art, the extrusion process allows an operator to rapidly generate a 3D model of regular shaped objects as is the case here where just two mouse strokes are involved (see also Appendix A).

In another exemplary embodiment an operator is able to mirror parts of an object that have already been generated to define parts of that object that may not be visible in the image set. This allows visible geometry and texture to be duplicated in order to model non-visible aspects of an object including texture. The production rule for this process is Mirror Drawn mirror lines [Mirror mode] ⇒ All geometry in M-list (and associated texture information) duplicated.

Figure 8A:
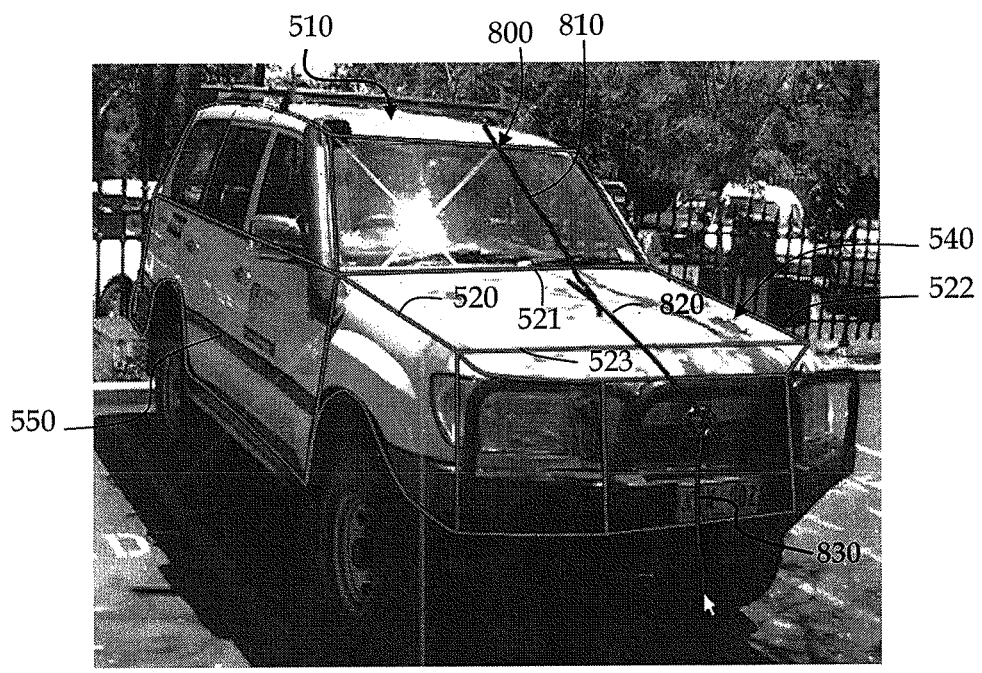
FIGS. 8a and 8b depict the use of a mirror plane in a series of 2D images to aid in forming a 3D model of the four wheel drive illustrated n FIG. 5.
Figure 8B:

Referring now to FIGS. 8a and 8b, there is once again shown the vehicle 510 shown in FIG. 5. In FIG. 8a the left side 550 of the vehicle and the front portion 820 of the vehicle have been traced on the 2D image and are selected to be mirrored. One or more mirror lines 800, 810, 820 are then traced along the relevant surfaces to indicate the estimated intersection of these surfaces with a mirror plane 800.

The midpoint of each surface edge that intersects a mirror line is then calculated. It is assumed that at least a subset of these midpoints belong to the mirror plane 800. Potential mirror planes are then generated by choosing sets of three such midpoints, forming a plane from them, and mirroring the selected geometry about that plane. Each potential plane is evaluated by measuring the total distance from the reflected copy of the vertices to the previously modeled vertices on the far side of the mirror plane. As shown in FIG. 8a, this would be the right hand side of the front bumper, bonnet and windscreen which have already been traced.

The plane that minimises this error is chosen, and then optimised using the same measure. Once it has been optimised, the existing part of the model on the far side of the mirror plane is replaced by a reflected version of the model on the near side of the plane as best shown in FIG. 8b where it can be seen that the rear portion 860 of the right hand side of the car has been generated as a symmetric version of the already modeled left hand side of the vehicle 850 (see also description in Appendix A).

Figure 9A:
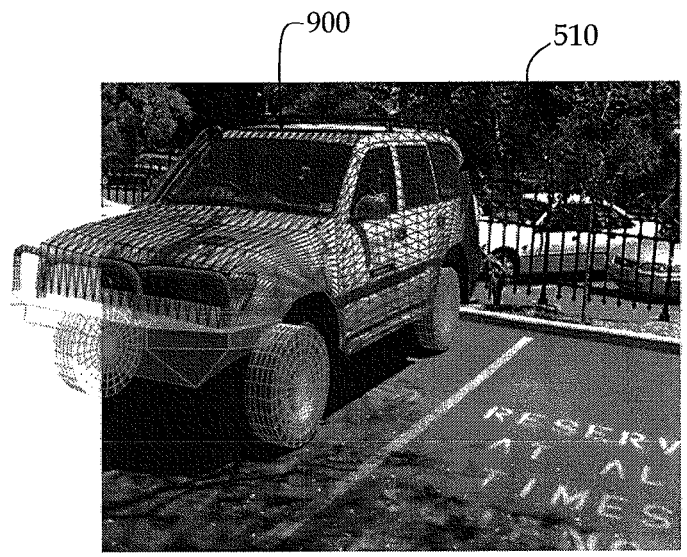
FIGS. 9a and 9b depict the 3D model of the four wheel drive illustrated in FIG. 5 generated in accordance with an exemplary embodiment of the present invention.
Figure 9B:
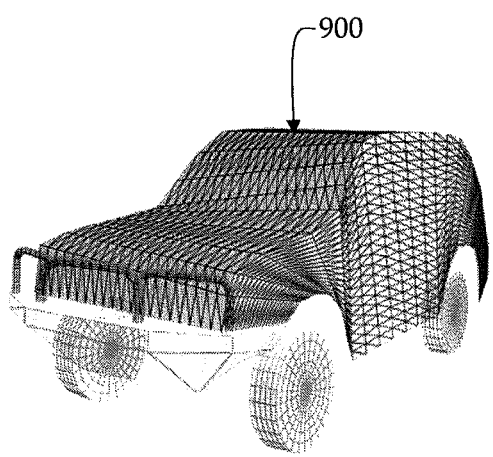

Referring now to FIGS. 9a and 9b, there are shown depictions of the 3D model 900 of the vehicle 520 generated in accordance with one or more of the exemplary embodiments described herein. Inspection of the 3D model 900 in the overlaid view (see FIG. 9a) readily demonstrates the fidelity of the generated 3D model.

Figure 10:
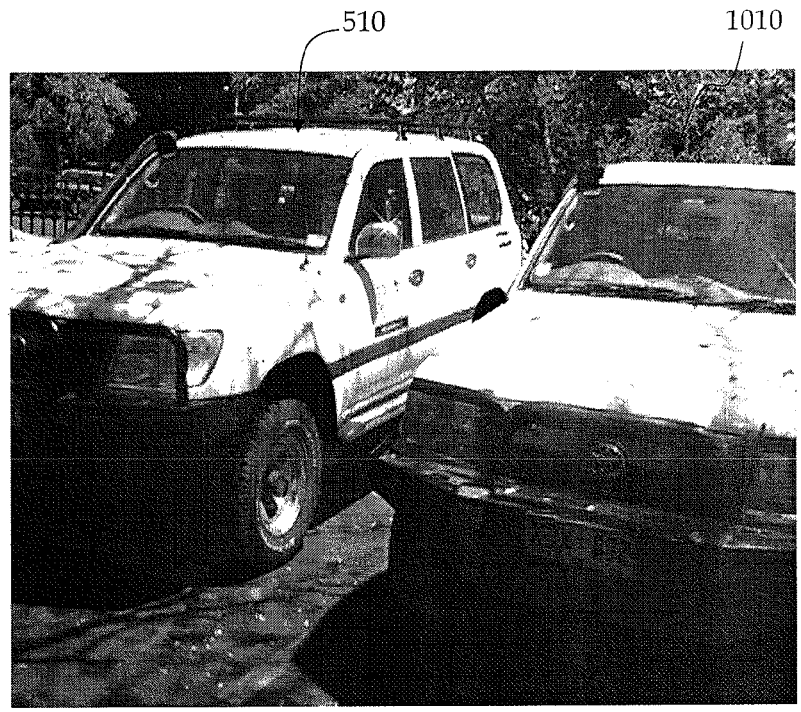
FIG. 10 is a 2D image showing the four wheel drive as illustrated in FIG. 5 (on the left) and a copy (on the right), the copy formed from a 3D model generated in accordance with an exemplary embodiment of the present invention.

Referring now to FIG. 10, there is shown an image from a video image sequence depicting the vehicle 510 illustrated in FIG. 5 (left hand side) and a copy 1010 (right hand side) formed from the 3D model 900 of vehicle 510. Because vehicle copy 1010 is a 3D model it will behave as 3D entity responding appropriately to the camera orientation and location as the video image sequence proceeds.

Figure 11:
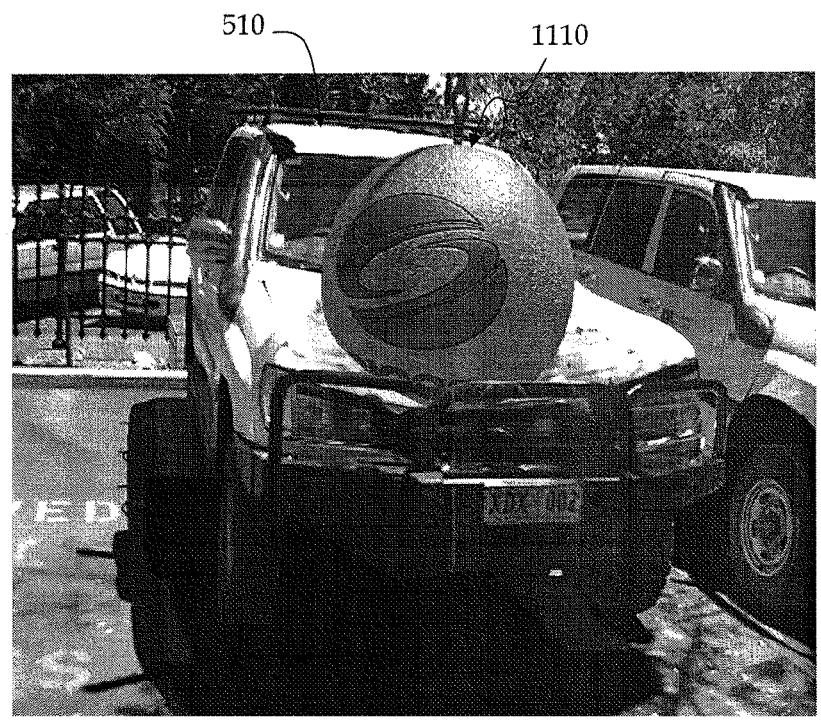
FIG. 11 is a 2D image depicting the physical reaction of the 3D model of the four wheel drive illustrated in FIG. 5 interacting realistically with a synthetic object.

Referring now to FIG. 11, a synthetic object 1110 has been inserted into video image sequence. As the 3D shape of the car 510 is known, it can interact convincingly with a dynamic synthetic object 1110 which in this example crushes the bonnet. The modeling of physical interactions between 3D objects whose mesh is known is a standard part of commercial modeling packages. Thus, once the 3D mesh of the object has been recovered from the images, it can be manipulated in the same way as a manually generated model.

As would be readily appreciated by those skilled in the art, an operator faced with the task of generating a 3D model of an object in a series of images such as a video image sequence can trace out the object in one image thereby generating an initial estimate of the corresponding 3D model. The projected 2D outline of the current estimated 3D model is then projected into one or more of the remaining series of images where it may be modified by the operator by dragging line endpoints or lines in the new image or images so that they trace out the boundaries of the same polygons or objects as in the initial view. These interactions are then used to update and refine the 3D model so that it fits the 2D projections in both frames.

Where there are reconstructed 3D points, these are employed to further aid in the generation of the 3D model as described above with the fitting process occurring in real time. This allows the user to switch between images from the original series of images naturally, selecting the most appropriate image to modify to refine the 3D model being generated. Through this process the user rapidly develops an accurate 3D model of the object through a set of intuitive 2D interactions.

In this manner, an operator is continuously refining this tracing operation by making use of their ability to recognise the orientation and aspect of the object being modeled as depicted in the various views shown in the series of 2D images. As described previously, these tracing operations may be further extended to include the ability to extrude a planar shape and define mirror planes about which already traced aspects of an object may be reflected to take into account the innate symmetry of an object. Once again, the extruded or mirrored sections may be modified within the series of images to further refine the 3D model.

A brief consideration of the exemplary embodiments described herein indicates that each of the tracing operations provides an intuitive and powerful means of modeling shape from a series of images such as a video image sequence which executes rapidly enough to be used interactively. This immediate feedback allows the user to model rapidly those parts of the scene which are of interest and to the level of detail required. The combination of automated and manual reconstruction allows an operator to model parts of a scene depicted in an image that are not visible, and to succeed in cases where purely automated approaches would fail. Accordingly, the modeling process allows an operator to apply a high-level understanding of the scene in driving the modeling process. The operator is able to accumulate information from the visible part of the scene and transfer it to those not visible. This allows the operator to generate a 3D model which matches their high-level understanding of the shape of the whole of the scene, but also to generate models which reflect the shape of an imagined landscape on the basis of visible scene elements.

These 3D models might be inserted into a video game or a simulation environment. In a further exemplary embodiment directed to video editing, an object depicted in one video image sequence or series of images may be modeled and then inserted into another video image sequence similar to a 2D "cut and paste" operation (see also Appendix B).

Figure 12:
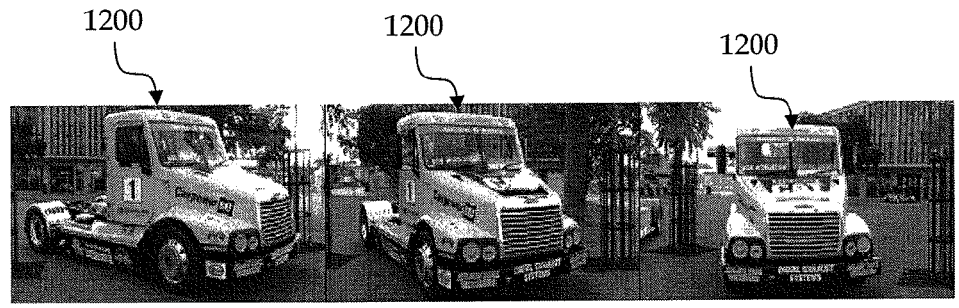
FIG. 12 is a selection from a series of images of a truck from a video image sequence.

Referring now to FIG. 12, there is shown a selection of three video frames from a video image sequence depicting various views of a truck 1200 entering through a gate.

Figure 13:
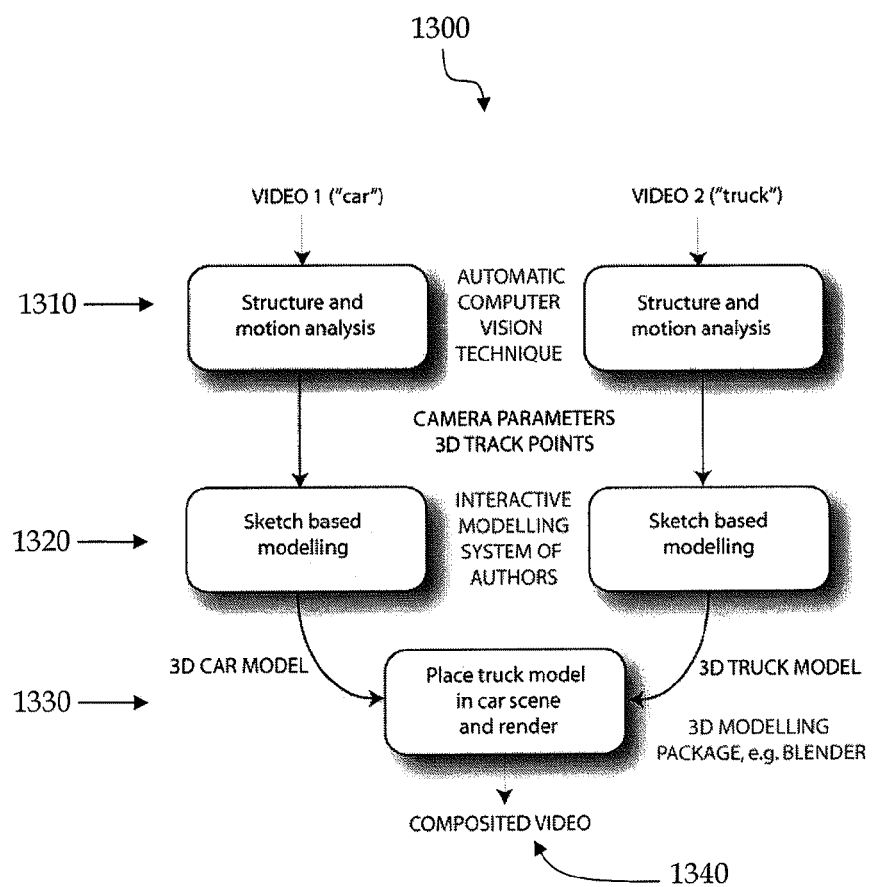
FIG. 13 is a flowchart of a video editing process in accordance with a further exemplary embodiment of the present invention.

Referring now to FIG. 13, there is shown a flow chart of the process involved in "cutting" the truck from the video image sequence illustrated in FIG. 12 (VIDEO 2) and pasting it into the video image sequence referred to previously with respect to FIG. 5 and FIGS. 8 to 11 (VIDEO 1) depicting vehicle 510.

At step 1310, SFM analysis is undertaken on both sequences in accordance as described above. Whilst in this exemplary embodiment, camera parameter information is obtained from the SFM analysis, equally it could be obtained by direct measurement of the orientation and setup of the camera taking the video image sequence. Whilst not essential, SFM analysis will provide some reconstructed 3D point information which may be employed to further inform the 3D model generation process by providing a sparse model of scene structure. Equally, 3D point information may be obtained extrinsically by initial survey information or by the use of laser rangefinders or other equivalent position measuring devices.

At step 1320, 3D models of vehicle 510 and truck 1200 are generated in accordance with the exemplary embodiments described above. In this example as truck 1200 is to be placed in the video image sequence containing vehicle 510, further aspects of the VIDEO 1 sequence are also modeled such as the location of the ground plane 580.

In this exemplary embodiment software is provided that incorporates a video viewer, in which the user can navigate between frames of video using a slider. The operator then selects a convenient frame and begins sketching the major structural components of the object they wish to model. Surfaces are formed from connected sets of strokes, and new surfaces share strokes with existing ones. Operations such as extrusion are specified from a toolbox, and by sketching a stroke to indicate which face is to be extruded and by how much. Textures for each face of the model are estimated from frames of the video in which they are best seen (see for example Niem, W. and Broszio, H., "Mapping Texture From Multiple Camera Views Onto 3d-object Models for Computer Animation", In *Proc. Int. Workshop on Stereoscopic and Three Dimensional Imaging*, 1995, pp. 99-105, hereby expressly incorporated by reference in its entirety).

As would be appreciated by those skilled in the art, the level of detail required of a model depends upon the purpose for which it will be employed. For instance, the level of detail required generally increases with the separation between the new viewpoint and the viewpoints of the original video image sequence. The relationships between objects also affect the accuracy required of the corresponding models. In terms of the current cut and paste example, objects in the destination video image sequence (VIDEO 1) which occlude objects to be pasted in must be modeled with much greater accuracy than background objects.

At step 1330, the 3D model of truck 1200 is inserted into VIDEO 1. This can be done at an initial stage in order to visually determine the relationships between the inserted model and other objects in the video image sequence which may require modeling. In most cases it is unnecessary to model the majority of the scene with much detail, but elements which occlude or cast shadows require greater attention.

Given the models created through the process above, and the known camera parameter information, a commercial 3D modeling package may be employed to cast the shadow cast by truck 1200 over the ground plane 580 and then re-render the vehicle video using its camera parameters. The rendering engine of the modeling package uses the depth values from the car model and the truck model at each frame to calculate occlusion. This is done using inbuilt functionality of the modeling package, in the same way as any 3D model is rendered.

Figure 14:
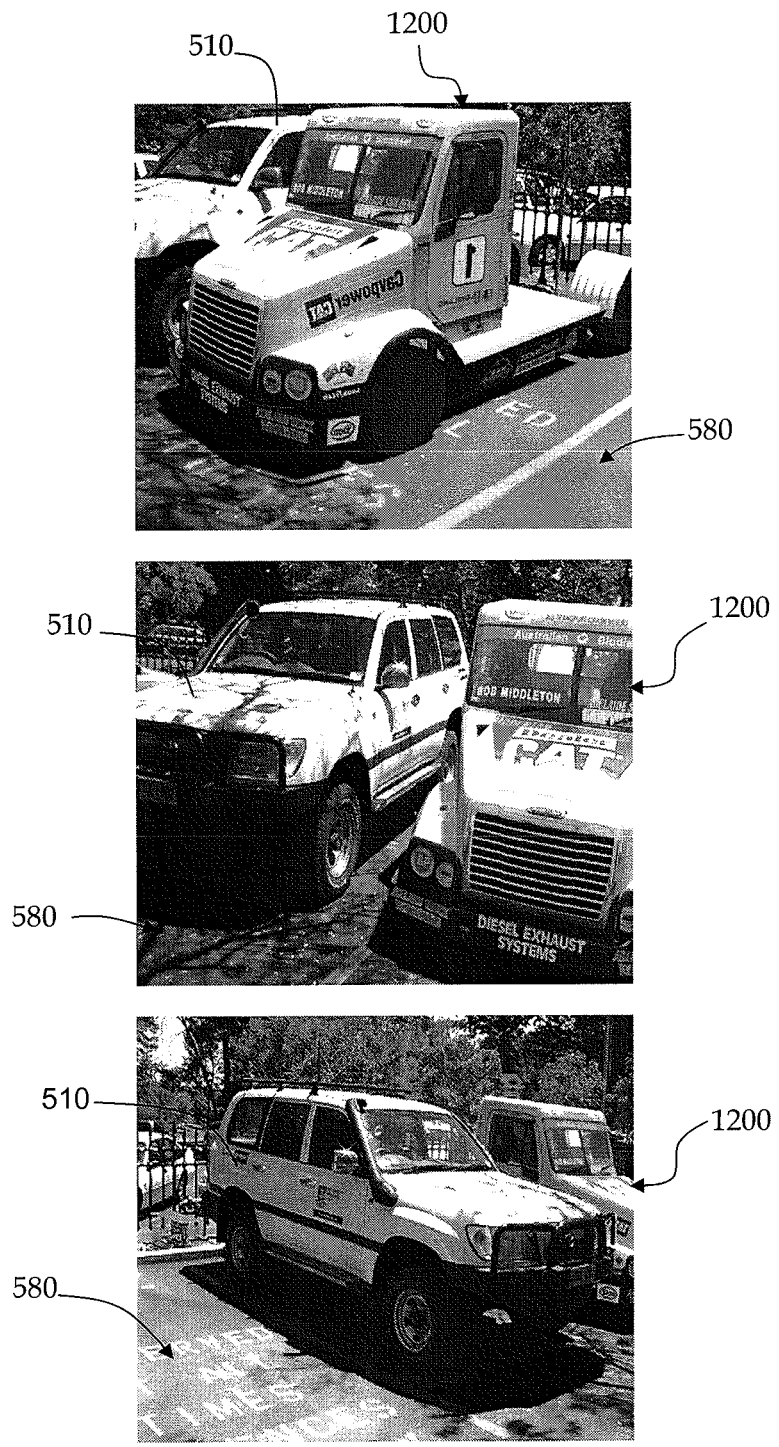
FIG. 14 is a selection of a series of images from a composited video image sequence showing the four wheel drive illustrated in FIG. 5 with a 3D model of the truck illustrated in FIG. 13 inserted in the video image sequence.

Referring now to FIG. 14 there is shown a selection of frames from the resultant composited video image sequence depicting both the vehicle 510 and truck 1200 parked next to each other. As can be seen by inspection, truck 1200 correctly occludes vehicle 510, and has been enhanced with lighting, shadow and extra structure not visible in the source video image sequence. As the right side of the truck 1200 is not seen in the truck video image sequence (VIDEO 2), textures have been mirrored from the other side.

As would be apparent to those skilled in the art, the ability to generate texture mapped 3D models quickly and easily from video has the potential to decrease the time required to model real world objects, and also to facilitate a range of sophisticated video effects.

In another illustrative embodiment directed to video editing, a video image sequence can be regenerated from a different camera orientation i.e. by re-rendering a video image sequence with a new camera path. This can allow re-rendering of the video image sequence from viewpoints not seen in the original video image sequence if all foreground objects are modeled in 3D. Parts of the scene that are distant from the camera can be approximated as having a constant, fixed depth. In this case they do not need to be modeled in order to be rendered convincingly from new viewpoints. Instead, their image can be linearly warped to approximate their appearance from a different but nearby point of view.

Furthermore, existing 3D modeling packages may be used to change the appearance of a 3D model on a per pixel basis. These can be applied to the recovered model to render it more realistically into a different environment. For example, truck 1200 could be lit using a golden hued light and then rendered into a sunset scene. Customised textures can also be decalled onto the surfaces of the object before it is rendered.

In addition, many 3D modeling packages allow a mesh to be deformed based on a specified physical force. This can be applied to a recovered model to simulate forces acting on it.

The interaction between two models can be rendered for example, two cars crashing into each other (see also FIG. 11).

Whilst in this exemplary embodiment, a 3D model of a real object (e.g. a truck) has been cut and pasted into a real world video, equally the 3D model can be inserted into a synthetic video of an artificial environment or alternatively a synthetic 3D model of an object be inserted into a real world environment that has been modeled in accordance with the exemplary embodiments described herein.

Figure 15:
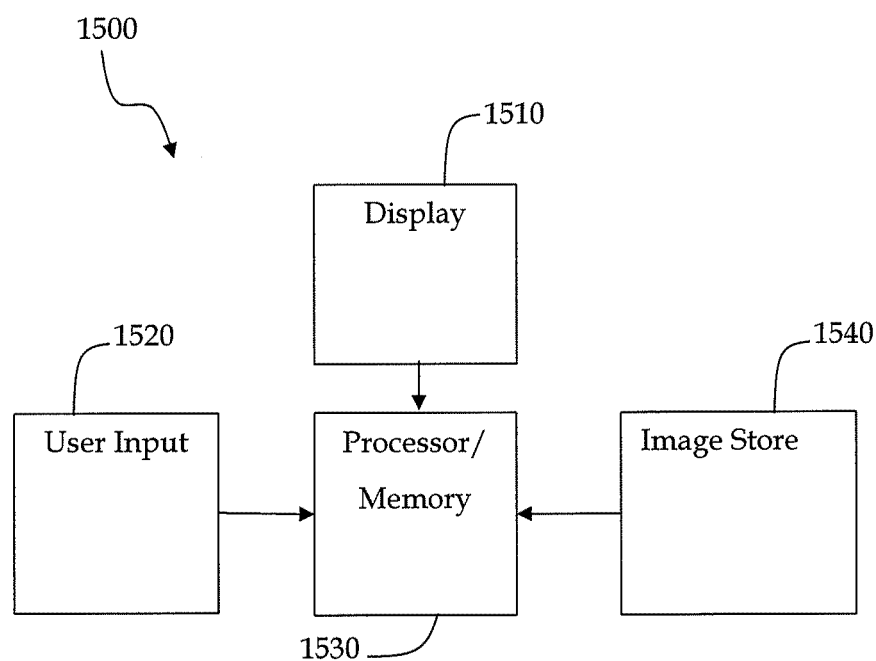
FIG. 15 is a system for generating a 3D model of an object from a series of images in accordance with an exemplary embodiment of the present invention.

Referring now to FIG. 15, the various exemplary embodiments of methods for generating 3D models as described throughout the specification may be implemented in a 3D modeling system 1500 which includes a processor and a memory combination 1530 having stored thereon machine-executable instructions to be executed by the processor to perform one or more of the methods described herein. 3D modeling system 1500 includes an image store 1540 for storing 2D images (e.g. images 100, 200) and a display 1510 for displaying the 2D images.

3D modeling system 1500 further includes user-input 1520 for interactively receiving operator input which then may be displayed on display 1510. User input 1520 may include a mouse, keyboard, joystick, tablet or any combination thereof to allow an operator to trace 2D lines on the 2D images. These traced 2D lines may then form the input information for the generation of 3D lines and hence 3D surfaces and models.

In one exemplary embodiment, the present invention may be employed to generate a 3D model of an urban landscape such as a streetscape. In this embodiment, an operator would first take a video image sequence of the streetscape from a moving platform such as a vehicle. Camera parameter information may then be directly collected for each 2D image in the video image sequence by the use of sensors which measure directly location (e.g. by a global positioning system (GPS)) and orientation such as yaw, pitch, roll (e.g. by the use of an inertial navigation system (INS)).

Similarly, further camera parameter information associated with a 2D image such as focal length can be directly logged with the location and orientation information onto a data collection system. Furthermore, direct 3D measurements of the fronts of buildings for example, may be taken by distance measuring equipment such as a laser or ultrasonic rangefinder. As has been described above, this information may be used advantageously to further aid the generation of the 3D models corresponding to the buildings and streetscape in general.

Once the video image sequence and the associated camera parameter information have been gathered, then 3D models of the various objects within the streetscape can be generated in accordance with the various exemplary embodiments of the invention that have been described. As has been described already, camera parameter information and 3D point information may be also be generated by a SFM analysis of the video image sequence.

As would be readily apparent to those skilled in the art, the ability to rapidly and interactively generate 3D models by tracing these objects in 2D, as depicted in various frames of the video image sequence, to constrain and accurately provide a corresponding 3D model represents a significant advance over the prior art. This due to prior art methods which rely on the laborious process of a highly skilled operator who attempts to derive the 3D model explicitly from the various views of the object. In this example, the simple action of driving down a street with a suitably equipped vehicle will provide sufficient data to then generate a 3D streetscape.

This capability has many applications including both military and civilian. In one military application, the extent of damage to infrastructure may be determined by driving through a bomb damaged terrain, generating a 3D model of the terrain and then comparing this to known data. In another application, a facility that may be the subject of a covert attack could be readily modeled by an operator from a video image sequence taken by a hand held camera or the like by a person who is able to conduct a walk through of the facility. Alternatively, the dimensions of the external features of a facility could be determined by walking around the facility and capturing a video image sequence.

In one example civilian application directed to urban planning, a 3D model of a streetscape would allow the effects of the introduction of a new building into that streetscape such as shadowing and noise attenuation to be determined. In a further example, utilities such as Google® Earth are now including 3D models of various geographic and person made entities. Clearly, the ability to rapidly generate 3D models of objects will greatly increase the number of included 3D models and hence the utility of these tools.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The drawings in the present application and their accompanying detailed description are directed to merely example embodiments of the invention. To maintain brevity, other embodiments of the invention which use the principles of the invention are not specifically described in the present application and are not specifically illustrated by the present drawings.

The word "exemplary" is used exclusively herein to mean "serving as an example, instance or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. The software module, also called computer software in the present application, may contain a number of source code or object code segments and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC.

From the above description, it is manifest that various techniques can be used for implementing the concepts of the present invention without departing from its scope. Moreover, while the invention has been described with specific references to certain embodiments, a person of ordinary skill in the art would recognize that changes can be made in form and detail without departing from the spirit and scope of the invention. For example, details of the measures used to compare image regions described herein could be altered with little effect. Furthermore, the exact sketching interactions, and the exact production rules that have been specified could also be extended or modified without departing from the scope of the invention.

It will be understood that the term "comprise" and any of its derivatives (e.g. comprises, comprising) as used in this specification is to be taken to be inclusive of features to which it refers, and is not meant to exclude the presence of any additional features unless otherwise stated or implied.

The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A method for generating a three dimensional (3D) model of an object from a series of two dimensional (2D) images, wherein the series of 2D images depict varying views of the object and have associated camera parameter information, the method comprising:
    tracing the object in a first 2D image selected from the series of 2D images to provide a first set of tracing information;
    displaying a second 2D image selected from the series of 2D images on a display;
    projecting, on the display, an estimated representation of the object derived from the first set of tracing information onto the second 2D image selected from the series of 2D images;
    modifying, on the display, the estimated representation of the object that is projected on the second 2D image based on the second 2D image that is displayed on the display to provide a second set of tracing information; and
    generating the 3D model of the object based on the camera parameter information and the first and second sets of tracing information.

2. The method of claim 1 further comprising:
    refining, on the display, the estimated representation of the object that is projected onto the second 2D image for further providing the second set of tracing information.

3. The method of claim 1, wherein the generating of the 3D model includes basing the generation on additional 3D point information related to the object.

4. The method of claim 1, wherein the series of 2D images is a sequence of 2D images.

5. The method of claim 4, wherein the sequence of 2D images is a video image sequence.

6. The method of claim 5, wherein the camera parameter information is derived from a structure from motion analysis of the video image sequence.

7. The method of claim 1, wherein the modifying is facilitated by snap fitting to pixel boundaries.

8. A method for generating a three dimensional (3D) model of an object from a series of two dimensional (2D) images, wherein the plurality of 2D images depict varying views of the object and have associated camera parameter information, the method comprising:
    selecting a geometric primitive and lining up the geometric primitive with shape characteristics of the object to trace the object in a first 2D image;
    displaying a second 2D image selected from the series of 2D images on a display;
    projecting, on the display, the geometric primitive as traced in the first 2D image onto the second 2D image selected from the series of 2D images;
    modifying, on the display, the projected geometric primitive that is projected on the second 2D image based on the second 2D image that is displayed on the display to trace the object in the second 2D image; and
    generating the 3D model based on the modified geometric primitive and the camera parameter information associated with the first and second 2D images.

9. The method of claim 8, wherein the geometric primitive is a 3D geometric primitive.

10. The method of claim 8, wherein the generating of the 3D model includes basing the generation on additional 3D point information related to the object.

11. The method of claim 8, wherein the series of 2D images is a sequence of 2D images.

12. The method of claim 11, wherein the sequence of 2D images is a video image sequence.

13. The method of claim 12, wherein the camera parameter information is derived from a structure from motion analysis of the video image sequence.

14. The method of claim 8, wherein the modifying is facilitated by snap fitting to pixel boundaries.

* * * * *